No. 827,766. PATENTED AUG. 7, 1906.
A. WEISS.
MOTOR VEHICLE.
APPLICATION FILED APR. 27, 1905.
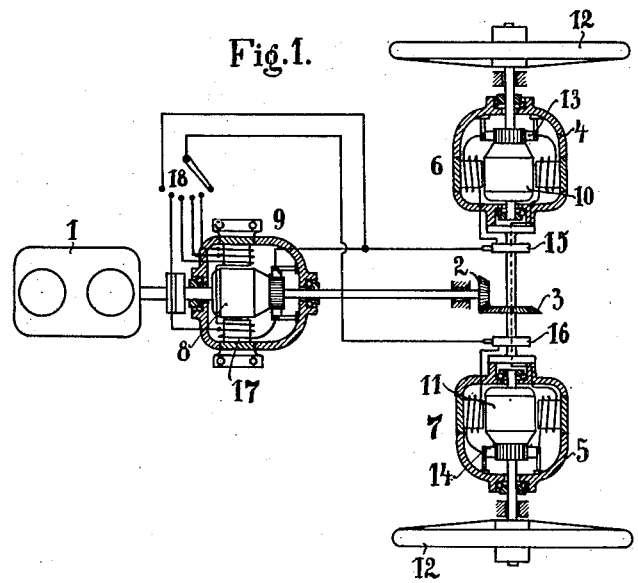
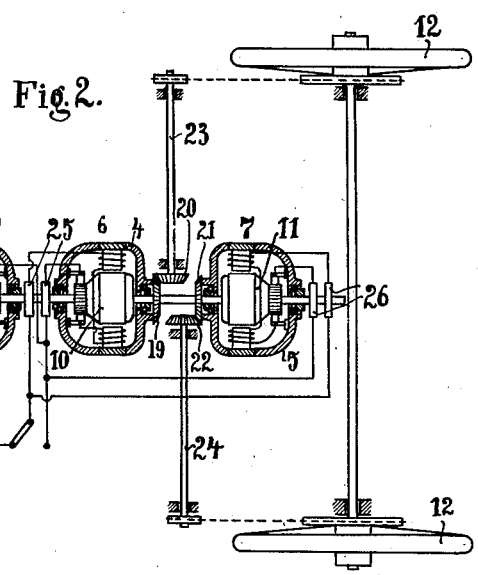
Witnesses
Inventor
August Weiss

UNITED STATES PATENT OFFICE.

AUGUST WEISS, OF COLOGNE, GERMANY.

MOTOR-VEHICLE.

No. 827,766.　　　　　　Specification of Letters Patent.　　　　　Patented Aug. 7, 1906.

Application filed April 27, 1905. Serial No. 257,744.

*To all whom it may concern:*

Be it known that I, AUGUST WEISS, engineer, a subject of the Grand Duke of Hesse, residing at Cologne, Germany, have invented new and useful Improvements in Motor-Vehicles, of which the following is a specification.

The present invention relates to the application of the electric transmission of power for the propelling of cars of any kind, and has for its object to provide a simple method of regulating the speed of propulsion without the use of change and differential gearing and to attain a high degree of efficiency in the transmission of the power.

So far as electric transmission of power has hitherto been applied to cars it is effected in the manner that a direct-current dynamo is coupled with the prime motor, (benzin or steam engine,) which dynamo supplies the motors acting upon the front or hind wheels. The regulation of the number of revolutions of the motors is attained either by the varying of the motors or by a regulation of the tension of the dynamo. For this arrangement it is therefore characteristic that the loading of the dynamo increases with the loading of the motors. The dynamo is therefore loaded to the maximum during the utmost requirement of the motors, so that during full-speed travel it must continuously give its maximum production. Therefrom results that the dynamo must be constructed comparatively heavy and that the efficiency of the transmission is relatively only small. These drawbacks are obviated, according to the present invention, in the following manner:

The prime motor is coupled either directly or by means of intermediate mechanism to the revoluble field-magnets rigidly interconnected of two or more dynamos, the armatures of which revolve independently of one another with regard to their fields and drive the car-wheels either directly or by means of intermediate gearing and is at the same time connected with the armature of another stationary dynamo. By reason of the kinematic reversal of armature and field-magnet in the machines acting upon the wheels the arrangement can also be made that all armatures are connected rigidly or by gearing with one another and are driven from the principal source of power, while field-magnets independent one of another revoluble about their armatures give off the power to the outside. The field-magnet windings of the machines driving the wheels are coupled in series with their armatures, whereas the stationary dynamo can be provided with direct, induced, or compound winding. All machines can also be excited from other sources.

According to this invention the machines are so interconnected and calculated that the electromotive force (whether self-induced or from outside) of the machines driving the car-wheels and that likewise (self-induced or from outside) of the dynamo are of opposite direction, and the former exceeds the latter. The control of the speed is then effected by altering the electromotive force of the stationary dynamo in such a manner that in order to increase the speed of travel the electromotive force must be diminished, and at the maximum working efficiency the dynamo is cut out altogether. This stationary dynamo therefore does not require to be constructed proportionate to the maximum efficiency of the driving-motor, but can be considerably smaller and lighter. In the same way the driving-motors can be constructed lighter than corresponding motors of the construction above mentioned, (at the commencement of this specification,) because at their maximum efficiency the iron losses in consequence of the relatively small number of revolutions of the armature disappear.

The driving-machines work as generators, with a turning moment that is determined by the tension, current, and number of revolutions of these machines. The electric energy generated by the driving-machines is conducted into the stationary machine coupled with the benzin-motor. This machine is running as motor in that direction in which the benzin-motor turns and aids the turning moment of the latter. Consequently the effect produced by the benzin-motor is only equal to the difference between the combined effect of the driving-machines and the stationary motor. When the vehicle stands still, this effect of the benzin-motor is therefore equal only to the losses occurring in the electric machines—*id est*, said effect is very slight, while the drawing momentum may be increased to any desired extent by means of intensifying the electric current. Consequently by this new arrangement there is attained, in addition to a simple regulation of the speed of travel, an increased efficiency of the power transmission and a high tractive force.

In the accompanying drawings the new driving device has been illustrated in two modifications by way of example.

Figure 1 shows an arrangement in which the wheels are directly driven by the armatures of two machines. Fig. 2 shows the arrangement in which the wheels are driven by the field-magnets by way of chain gearing.

In the modification shown in Fig. 1 the driving-motor is connected, by means of the gearing 2 3, with the field-magnets 4 5 (rigidly connected to one another) of the two electric machines 6 7 and at the same time with the armature 8 of a third machine 9. The magnetic fields 4 5 of the machines 6 7 rotate, consequently, at the speed of the driving-motor 1 or at a multiple thereof. The armatures 10 11 of these machines are arranged independently of one another revolubly with regard to their fields 4 5 and drive the wheels 12 of the car directly. The brushes 13 and 14 are connected rigidly with the magnet-casings 4 and 5, and therefore rotate with the magnetic fields. All the machines are self-exciting, and the field-magnet windings of all the machines are arranged in series, and contact-rings 15 16 are provided for taking the current from the machines 6 7.

The regulation of the speed of travel is effected by altering the number of the excitation-windings of the machine 9. For this purpose branches are led from the field-magnet winding 17 of this machine to the switch 18, which admits of the windings being cut in or out, according to requirement.

The operation of this device is as follows: If the armatures 10 11 are at rest while the magnetic fields 4 5 are rotating at a speed $= n_0$, then the armatures will also make $n_0$ revolutions relatively to their fields, so that at the contact-rings 15 16, so that by means of remanence, like in all self-exciting machines, there occurs a small tension $e_r$, which can be quickly increased to the value E by means of closing the external circuit in the well-known manner. As the machines 6 7 are connected in series with the machine 9, this tension excites a quickly-increasing current $i$, which brings the tension at the contact-rings to the amount $e$ and the tension of the machine 9 to the amount $e'$. The machines are, however, connected in such a manner that the tensions $e$ and $e'$ are opposed one to the other and are so calculated that $e$ shall be larger than $e'$. The current $i$ produces in the machines 6 7 a momentum of revolution which strives to revolve the armatures 10 11 in the direction of motion of their fields and in 9 a momentum of revolution of the same direction as that of the propelling-motor 1. The armatures 10 and 11 are consequently revolved and attain a certain number of revolutions $= n$. For this amount a calculation may be made on the following considerations: The current $i_1$, which creates the momentum of revolution necessary hereto, causes at the contact-rings 15 16 a tension $e_1$ and at the terminals of 9 a tension $e'_1$, which must satisfy the equation $e_1 - e'_1 = i_1 w$, in which the resistance in the current-circuit is indicated by $w$. Let now $e_0$ be the tension which occurs with the excitation $i_1$ at the contact-rings 15 16 when the armature 10 11 is at rest—that is to say, with a relative number of revolutions $n_0$ as against their fields. Then the relative number of revolutions of the armature is $n_1$, which corresponds with the same excitation $i_1$ to the tension $e_1$, which is equal to $$n_1 = n_0 \frac{e_1}{e_0}$$

and the absolute number of revolutions of the armature is $$n = n_0 - n_1 = n_0 \left(1 - \frac{e_1}{e_0}\right) = \frac{n_0}{e_0}(e_0 - e_1.)$$

Assuming that $e_1$ is equal to $i_1 w + e'_1$, then $$n = \frac{n_0}{e_0}(e_0 - e'_1 - i_1 w.)$$

This last equation shows that by regulating the tension $e'_1$ of the machine 9 the number of revolutions of the armature 10 11 can also be regulated in a very simple manner. The number of revolutions $n$ increases when the tension $e'_1$ of the machine 9 is diminished and attains for positive values of $e'_1$ a maximum for $e'_1 = 0$—that is, if 6 7 be short-circuited and 9 be cut out. The number of revolutions can, as may be seen from the equation, be further increased by reversing the direction of the tension of the machine 9.

In the constructional form according to Fig. 2 the armatures 8, 10, and 11 of all the machines are rigidly connected to one another and coupled with the driving-motor 1, whereas the field-magnets 4 5, which are revoluble around their armatures 10 11 independently of one another, develop power by transmitting their motion, by means of the gearing 19, 20, and 21 22, to the shafts 23 24, coupled by chain gearing with the wheels 12. For the collection of the current from the machine 6 7 there are provided the contact-rings 25 and the contact-rings 26. The excitation of the machine 9 is effected in this constructional modification from a special source of current 27, in the current-circuit whereof a regulating resistance 28 is interpolated in order in like manner, as has already been explained for the constructional form shown in Fig. 1, to be able to control the speed of travel by altering the tension of the machine 9.

Having now described my invention and in what manner the same is to be performed, what I claim, and desire to secure by Letters Patent, is—

1. In a motor-vehicle, a dynamo-electric machine operatively connected to each driving-wheel and having its armature and field-magnet both rotatable one of the rotating parts of each machine being rigidly connected to the corresponding rotating part of the other, and a prime motor coupled to said parts, and the other rotating parts being connected to the driven wheels independently of each other, a further dynamo-electric machine in electrical connection with the former machines, one part of which is stationary, while the other part is coupled with the prime motor, means for varying the electromotive force induced in the said stationary dynamo-electric machine or for cutting out the same, thus causing the said stationary dynamo to operate as a motor or a generator, substantially as described and for the purpose set forth.

2. An electric power-transmission system comprising dynamo-electric machines 6, 7 having their field-magnets and armatures both rotatable, the field-magnets 4, 5 rigidly connected to one another, a prime motor coupled to said field-magnets and the armatures 10, 11 connected to the driven wheel independently of each other, a stationary dynamo-electric machine 9 coupled with the prime motor 1, the said machine 9 being electrically connected with the machines 6, 7 and means for varying the counter-electromotive force of the said machine 9 so as to cause the same to operate as a motor and assist the prime motor 1, substantially as described and for the purpose set forth.

In testimony whereof I have signed my name to this specification in the presence of two subscribing witnesses.

AUGUST WEISS.

Witnesses:
 ERICH SIEG,
 N ETMO.